May 20, 1969 T. SALTZBERG ET AL 3,445,815

CENTRAL TO REMOTE STATION SIGNALLING SYSTEM

Filed Sept. 27, 1965 Sheet 1 of 4

INVENTORS
THEODORE SALTZBERG
RICHARD N. TERRY

BY Mueller Aichele & Rauner

ATTYS.

INVENTORS
THEODORE SALTZBERG
RICHARD N. TERRY
BY Mueller Aichele + Rauner
ATTYS.

CENTRAL TO REMOTE STATION SIGNALLING SYSTEM

Filed Sept. 27, 1965 Sheet 3 of 4

INVENTORS
THEODORE SALTZBERG
RICHARD N. TERRY
BY Mueller Aichele & Rauner
ATTYS.

CENTRAL TO REMOTE STATION SIGNALLING SYSTEM

Filed Sept. 27, 1965

INVENTORS
THEODORE SALTZBERG
RICHARD N. TERRY
BY Mueller Aichele & Rauner
ATTYS.

United States Patent Office 3,445,815

Patented May 20, 1969

3,445,815

CENTRAL TO REMOTE STATION SIGNALLING SYSTEM

Theodore Saltzberg, Chicago, and Richard N. Terry, Addison, Ill., assignors to Motorola, Inc., Franklin Park, Ill., a corporation of Illinois Filed Sept. 27, 1965, Ser. No. 490,353
Int. Cl. H04q 9/16
U.S. Cl. 340—163 11 Claims

ABSTRACT OF THE DISCLOSURE

A binary sequence is generated to be used as an address coding system for identifying a particular remote station to be controlled. The remote stations are identified by subsequences having fewer bits than the entire sequence and the entire sequence is so constructed that no subsequence is repeated in the sequence. Thus an identifying code of a large number of bits for security purposes can be used to address each station yet only a single additional bit need be transmitted to address each subsequent station.

In many applications it is desirable to monitor and control a large number of remote stations from a central location. The remote stations may be successively interrogated by the central station according to a planned program, or they may be interrogated as desired by operators at the central station. The central station may also initiate command and control signals for the remote stations. To obtain selective control, separate addresses are provided for each remote station. The addresses for each remote station must contain enough information to distinguish between the called remote station and other remote stations. The address must also contain enough information to prevent noise and interference from causing false operation of the system. If a complex separate address is transmitted to each remote station the number of remote stations which can be controlled in a given time is relatively small. If the addresses are transmitted at a faster rate a larger bandwidth is required.

It is, therefore, an object of this invention to provide a system for selectively controlling remote stations from a central station and having an improved address coding system.

Another object of this invention is to provide a system for selectively controlling a plurality of remote stations and in which a complete separate address is not required by each remote station.

Another object of this invention is to provide a system for selectively controlling a plurality of remote stations from a central station in which an alarm signal is generated when the number of errors in the received address signal exceeds a predetermined number in a particular period of time.

Another object of this invention is to provide a system for selectively controlling remote stations from a central station in which address information transmitted to other remote stations is used by a particular remote station as part of its address information.

Another object of this invention is to provide a system for selectively controlling a plurality of remote stations from a central station in which a predetermined number of correct addresses for other remote stations must be received by a particular remote station before the particular remote station will respond to the receipt of its address signal.

A feature of this invention is the provision of a system for selectively controlling a plurality of remote stations from a central station in which the central station has means for generating a predetermined number sequence and transmitting the sequence to the remote stations, and in which each remote station has means for generating the identical predetermined number sequence in synchronism with the sequence received from the central station.

Another feature of this invention is the provision of a system for selectively controlling a plurality of remote stations from a central station in which each remote station has means for comparing the generated sequence with the received sequence. Each remote station further having means for generating a control signal when a predetermined fixed portion of the received sequence, less than the entire sequence, has been received correctly.

Another feature of this invention is the provision of a system for selectively controlling a plurality of remote stations from a central station in which each remote station has means for comparing the generated sequence with the received sequence to develop an error signal in the event of a discrepancy between the received and the generated sequence. Each remote station further having means responsive to the error signal to shift the sequence generating means to a predetermined position in the sequence with said predetermined position preceding the address portion of the sequence by a predetermined number of bits so that the control signal will not be generated until at least said preceding portion has been received correctly.

Another feature of this invention is the provision of a system for selectively controlling a plurality of remote stations from a central station in which the central station has means for generating any one of a plurality of different number sequences.

Another feature of this invention is the provision of a system for selectivity controlling a plurality of remote stations from a central station in which the predetermined number sequence is transmitted by a series of pulses and in which the pulse width is varied to selectively control different functions at the remote station.

The invention is illustrated in the drawings in which.

In practicing this invention a code generator positioned at the central station generates a sequence of M numbers having no repeating subsequences of N or more numbers, where M is greater than the largest number in the sequence and N is greater than one and less than M. The sequence is transmitted to all of the remote stations simultaneously. Each of the remote stations receives the entire sequence and each is responsive to a different predetermined subsequence of N consecutive numbers to develop a control signal. The control signal is used to initiate a reply signal which is transmitted to the central station or to control desired functions at the remote station.

Each remote station generates a number sequence identical to the sequence generated by the central station and in synchronism with the received sequence from the central station. The remote stations compare the received sequence with the locally generated sequence and in the event of a discrepancy between the two, the remote station sequence generator is shifted to a predetermined point in the sequence. The remote station must receive a predetermined number of bits of a sequence correctly before it will recognize its address signal and take the action indicated by the address. If desired a single sequence generator can be used to generate the desired one of a pluarlity of different sequences with each sequence controlling a different series of operations. The sequence can be transmitted by a series of pulses of varying widths with the pulse width variation being used to selectively control different functions at the remote station.

Figure 1:
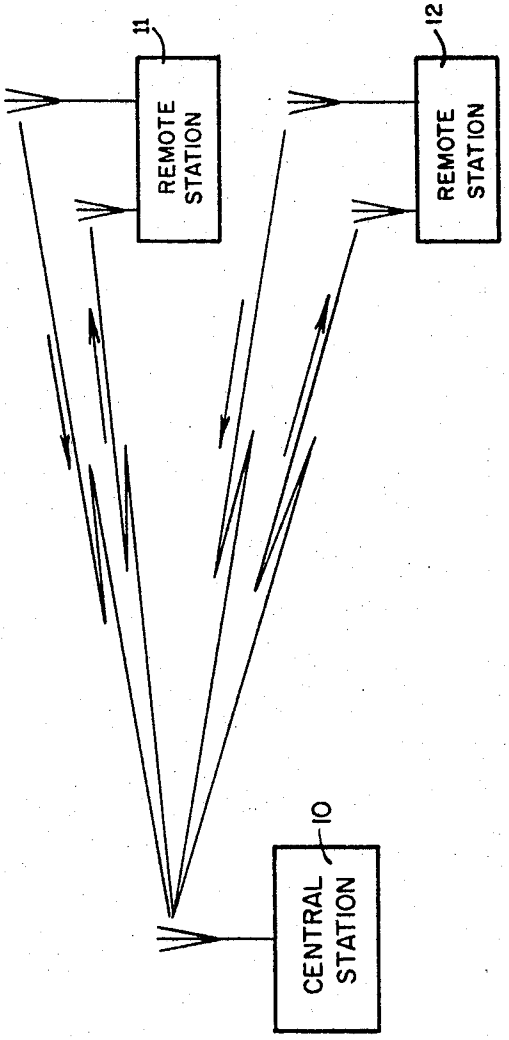
FIG. 1 is a block diagram illustrating the relationship between the central station and the remote stations.

FIG. 1 illustartes a system used for selectively controlling a plurality of remote stations from a central station. Central station 10 transmits a control signal which is received by each of the remote stations in the system. The transmission is shown as being by radio, however, the invention is not limited to this type of communication but can be used with other communication systems as, for example, wire lines. Also the system is not limited to two remote stations, but any number consistent with the operating requirements of the system can be used.

The signal transmitted from central station 10 includes an address which designates one or more particular remote stations. The station or stations designated by this address take the desired action upon receipt of the signal from the central station. For example, the signal transmitted from central station 10 may require a reply from remote station 11. Upon receipt of this signal from central station 10, remote station 11 will transmit the reply to the central station. At a later time central station 10 may send a signal to remote station 12 requiring a reply or other action by remote station 12.

Figure 2:
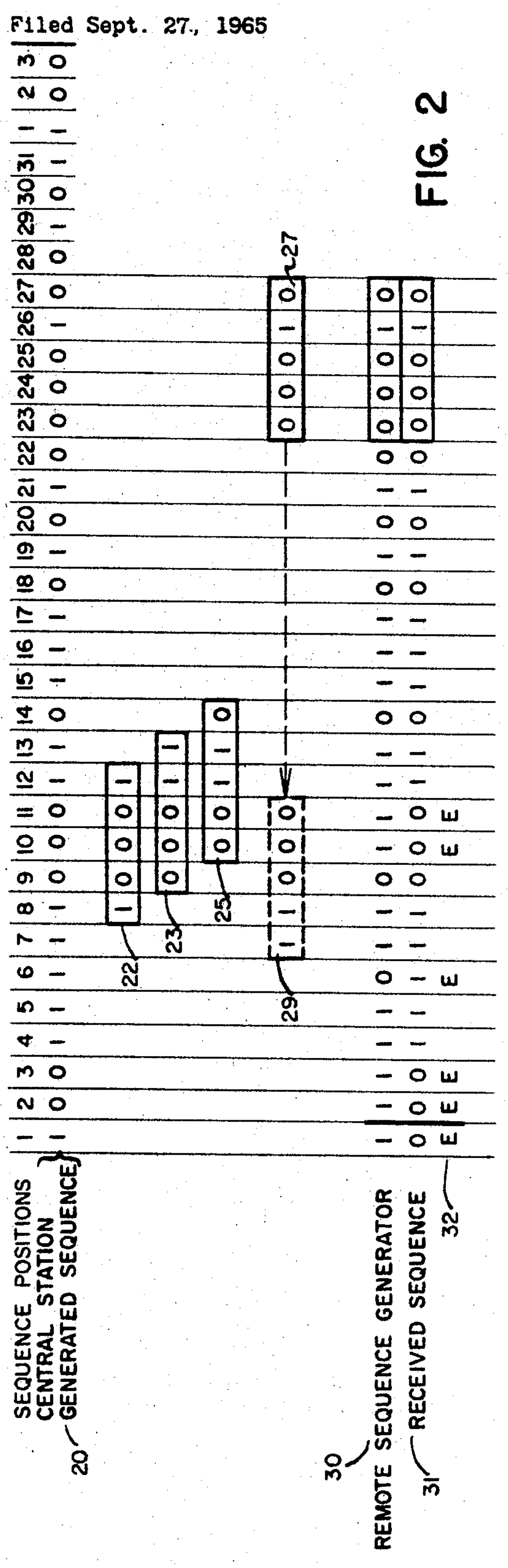
FIG. 2 is a table illustrating the generation and development of the address signals.

FIG. 2 illustrates the address coding system used in the system of this invention. Line 20 is a central station generated sequence of 31 bits in which there are no repeated subsequences of five or more bits. The sequence can be generated by a five bit shift register by appropriate feed back from selected stages of the shift register. The invention is not limited to this sequence or a sequence of similar length. It is also not limited to sequences generated by five bit shift registers or to binary sequences.

The sequence of line 20 is generated at the central station and is transmitted to remote stations from the central station. The central station repeats the sequence continuously during the time that it is controlling the remote stations. Each group of five consecutive bits forms a unique five-bit address code designating a particular remote station. Thus, code group 22 represents the binary number 10001 and is the address for a particular remote station. The next five consecutive bits in the sequence are shown in code group 23, as 00011 which is the address for a different station. Since there are no repeating subsequences of five bits in this sequence there will be 31 unique address groups, each of which can be used to control a remote station. If it is desired to control more than one station at the same time, one of the address codes could be used as an address for more than one remote station. Also, more than one address code could be used at a single remote station to control several different functions at the same station.

The remote stations receive the sequence of line 20 continuously, storing the last five bits received. When the stored five bits are the same as the remote station address, a control signal is developed to operate the remote station as desired. While each station requires five bits of information for its address, only one additional bit is transmitted to control the operation of a different station. For example, the code group of 22 may control remote station 11 of FIG. 1 with the transmission of one additional bit of information, to form code group 23, an address signal for remote station 12 is generated at the remote station. Thus, the remote stations have transmission security by requiring five bits of information to be transmitted in the proper order as an address signal without requiring that at least five separate bits be transmitted to each station. By this method the information bandwidth requirements of the control system are minimized without degradation of the transmission security of the system.

The security of the system can be extended by requiring that more than five consecutive bits be received correctly before the remote station will recognize a particular five bit group as its address or control signal. In this example, 16 consecutive bits, correctly received, are required for an address signal.

Assume that the address of the remote station being controlled is 00010 as shown in group 27. The remote station generates the sequence of line 20 in synchronism with the received bits and compares the locally generated sequence with the received sequence. When there is a discrepancy between the received sequence and the sequence generated at the remote station, the remote generator shifts to a predetermined part of the sequence. In this example the remote station generator shifts to the portion of the sequence shown in code group 29. At this point, the remote sequence generator is out of step with the received sequence. If 16 or more bits remain to be transmitted before the address signal shown in code group 27 will be received, the remote sequence generator will regain its synchronism with the received sequence. However, if an error occurs with less than 16 bits remaining between the error and the reception of the code group 00010, the remote station will not regain synchronism and will not recognize code group 00010 as a valid address. The system is not limited to 16 bits but any number of bits consistent with the requirements of the system can be used.

An example of the operation of a remote sequence generator in regaining its synchronism is illustrated on lines 30 and 31. Assume the sequence generated by the remote sequence generator and the received sequence are in synchronism. At sequence position 1 a "1" bit should be received as indicated by the "1" on line 30. However, because of transmission difficulties or other errors a "0" bit is received. This indicated as an error in transmission by the E on line 32 at sequence position 1. The discrepancy between the remotely generated sequence and the received sequenec causes an error signal to be generated at the remote station which will shift the remote sequence generator to code group 29, 11000. The next signal received from the central station is correct and is shown on line 31 as a "0" at sequence position 2. However, since the remote sequence generator is now out of synchronism with the received sequence, it will indicate that a "1" should have been received as shown at sequence position 12. Again, another error signal is generated causing the remote sequence generator to again shift to the code group 29. At sequence position 3 the process is repeated. At sequence position 4 a "1" is received and as shown at sequence position 12 a "1" is also generated by the remote sequence generator. Again at sequence position 5 the "1" received agrees with the "1" generated at sequence position 13 by the remote sequence generator. However, at sequence position 6 a "1" is received while a "0" is generated by the remote sequence generator at sequence position 14. This error again causes the remote sequence generator to return to the predetermined part of the sequence shown by code group 29. At sequence positions 7, 8 and 9 the sequence generated by the remote sequence generator and the received sequence agree. However, at sequence positions 10 and 11 there are again discrepancies causing the remotely generated sequence to again shift to the predetermined position in the sequence. At this point in the sequence, the remotely generated sequence and the received sequence are again in synchronism and will continue to be in synchronism from this point on unless another error signal occurs. When a minimum of 16 bits of errorless information have been received the remote sequence generator will contain the sequence 00010 which is the address of the remote station. The remote station is responsive to this correct address to carry out the action indicated by the address signal.

Figure 3:
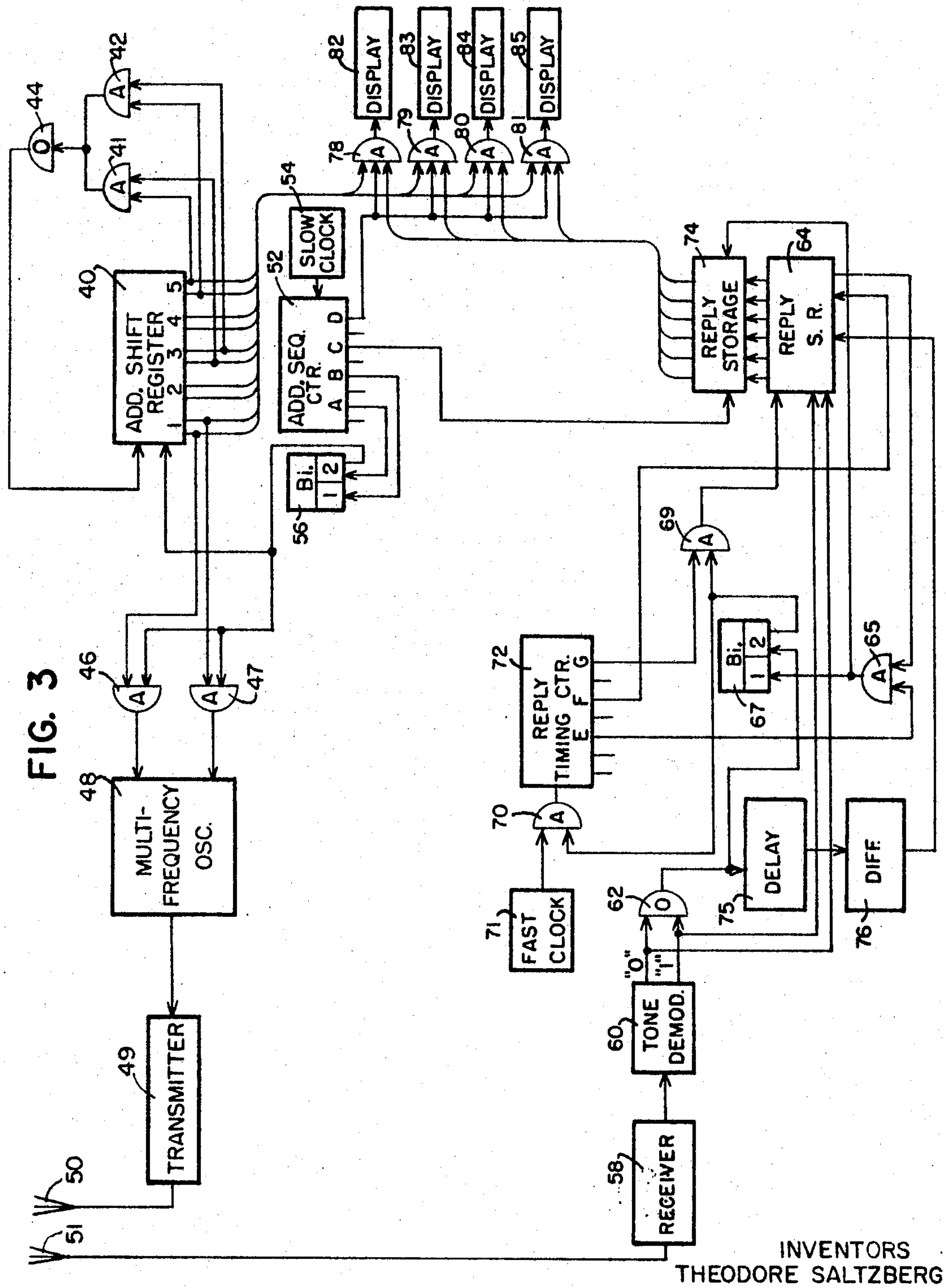
FIG. 3 is a block diagram showing the operation of a central station system.

FIG. 3 is a block diagram of the central station equipment used to control remote stations. Address shift register 40 contains a five bit binary number. The output of stages 3 and 5 are coupled through AND gates 41 and 42 and OR gate 44 to the first stage of the shift register. If the binary numbers in stages 3 and 5 are the same a "0" is coupled back to the first stage of address shift register 40. If the binary numbers in stages 3 and 5 are different a "1" is coupled back to the first stage of the address shift register 40. By means of this feedback the central station sequence of FIG. 2 can be generated. Shift register 40 is controlled by a clock pulse from bistable multivibrator 56.

The output of the first stage of shift register 40 is coupled to AND gates 46 and 47. If the output of the first stage is "0" it is coupled to AND gate 46 and if it is a "1" it is coupled to AND gate 47. AND gates 46 and 47 are enabled at a particular time in the cycle of operation to develop an output for controlling multi-frequency oscillator 48. Multi-frequency oscillator 48 normally operates at a rest frequency and the application of a control signal from AND gate 46 causes the frequency of the oscillator 46 to change to a second frequency called the "0" frequency. The application of a control signal from AND gate 47 causes multi-frequency oscillator 48 to shift to a third frequency called the "1" frequency. The output of multi-frequency oscillator 48 is coupled to transmitter 49 where it modulates a radio frequency signal which is transmitted over antenna 50. Thus, a series of ones and zeros, representing the sequence of shift register 40 and shown on line 20 of FIG. 2, is transmitted to the remote station.

The sequence of operation of the central station is controlled by address sequence counter 52 controlled by slow clock 54. When sequence counter 52 reaches count A a signal is applied to bistable multivibrator 56 causing this multivibrator to shift to its second stable state. The output of bistable multivibrator 56 is coupled to shift register 40 as a clock pulse causing the shift register to shift to its new number sequence. The output of multivibrator 56 also enables AND gates 46 and 47 and the new number in address shift register 40 is transmitted to the remote stations as previously described. When address sequence counter 52 reaches count B, address bistable multivibrator 56 is returned to its first stable state, disabling AND gates 46 and 47.

During the time interval between count B and count C of address sequence counter 52 a reply message may be received from the remote station through antenna 51 and receiver 58. The generation and transmission of this reply will be described in a subsequent portion of the specification. The message may be an 8 bit binary number and consist of tone signals representing "0" and "1." The tone signals are demodulated in tone demodulator 60 and the demodulated tones are coupled to OR gate 62, and reply shift register 64. In its initial condition reply shift register

64 has a "1" in its first register and "0's" in the remaining registers. As the received binary signal is fed into reply shift register 64 the "1" in the first stage shifts through the last stage of the shift register. When the "1" reaches the last stage an output signal is developed which is coupled to AND gate 65.

The output of OR gate 62 is coupled to bistable multivibrator 67 causing this multivibrator to change to its second stable state. While in its second stable state the output of bistable multivibrator 67 enables AND gates 69 and 70. With AND gate 70 enabled, pulses from fast clock 71 step reply timing counter 72 through its timing cycle. The output of step E is coupled through AND gate 65 to bistable multivibrator 67. However, since AND gate 65 is not enabled until later in the cycle of operation, no output is obtained from AND gate 65 during the reception of the reply information. The output of step F continuously resets the last stage of reply shift register 64 to "0" to insure that it will not operate until the "1" bit of the first stage has been carried through the shift register. The output of step G operates a clock pulse for reply shift register, causing the reply information received to be shifted through the shift register. When the "1" contained in the first register is shifted through shift register 64, AND gate 65 is enabled. When reply timing counter 72 reaches count E a signal is coupled through AND gate 65 to cause bistable multivibrator 67 to be shifted to its first stable state. This removes the clock pulses from reply timing counter 72 stopping the operation of this counter. The output of AND gate 65 is also coupled to reply storage 74 causing the information stored in reply shift register 64 to be parallel transferred to reply storage 74.

The output of OR gate 62 is also coupled to delay 75 and differentiator 76. If for any reason the tones representing either a "0" or a "1" should cease during the reception of a reply signal delay 75 will generate a step pulse which is differentiated by differentiator 76 and applied to reply shift register 64 to reset this register. This prevents noise from being received as a reply signal.

After the reply has been received and stored in reply storage 74, address sequence counter 52 reaches step C and a signal is applied to reply storage 74 which couples the outputs of reply storage 74 to AND gates 78 and 81. The information stored in reply storage 74 represents data obtained from a single remote station, however, it is coupled to AND gates 78 to 81 which control the display of information from every remote station. The information obtained from each remote station is displayed by readout displays 82 to 85. AND gates 78 to 81 are also coupled to address shift register 40. The AND gates are so connected that only the AND gate corresponding to the remote station designated by the address number contained in address shift register 40 receives an enabling signal. When address sequence counter 52 reaches count D a signal is applied to AND gates 78 to 81 causing the information contained in reply storage 74 to be transferred to the readout display representing the remote station designated by the number contained in address shift register 40.

Figure 4:
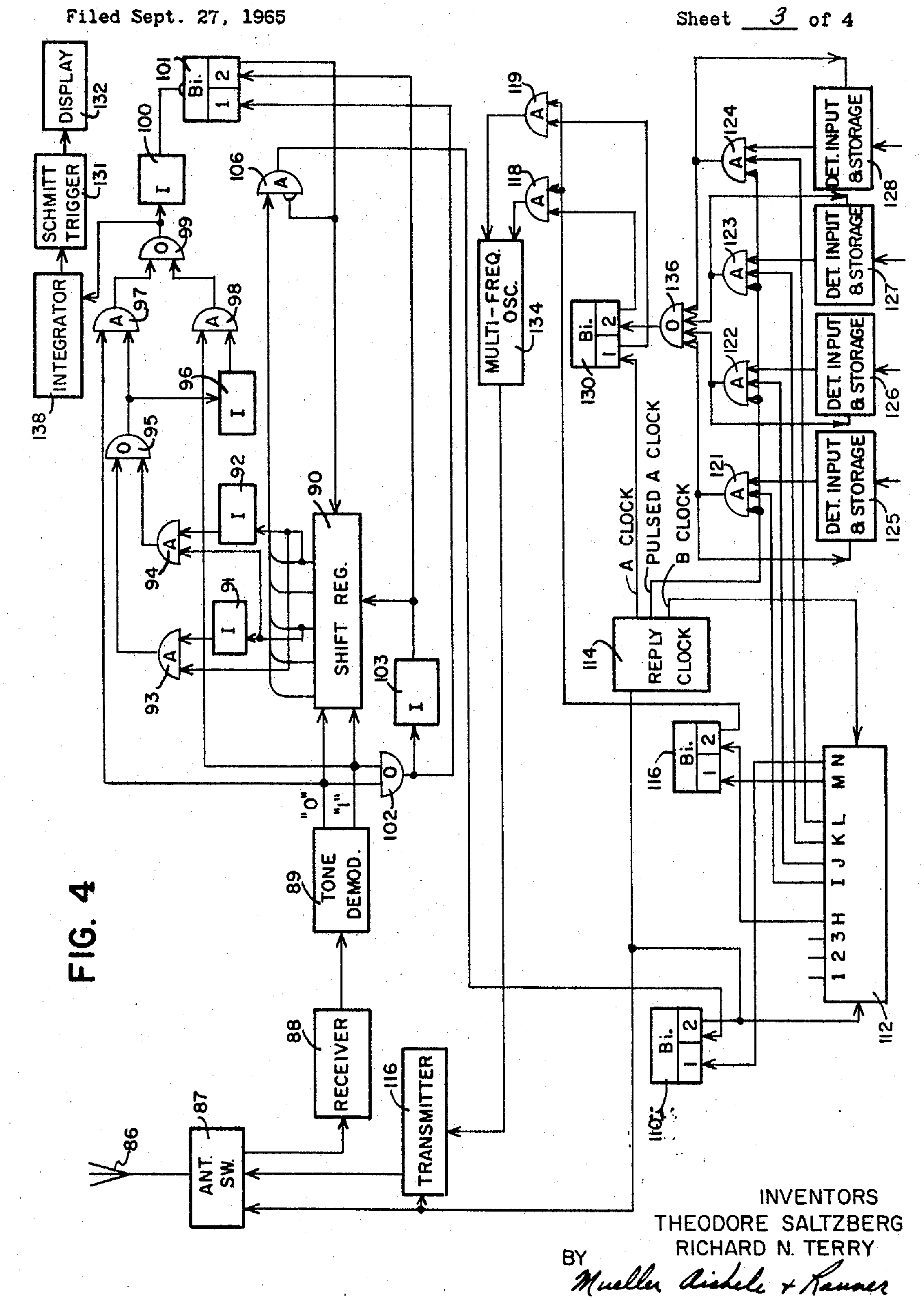
FIG. 4 is a block diagram showing the operation of a remote station.

FIG. 4 is a block diagram of a remote station system. Signals are received and transmitted over antenna 86. The received signal is coupled from antenna 86 through antenna switch 87 to receiver 88. Tone demodulator 89 detects the audio signals from receiver 82 to form a "0" or a "1" signal depending upon the frequency of the tones received. The "0" and "1" signals are coupled from tone modulator 89 to shift register 90. Shift register 90 is similar to shift register 40 of FIG. 3 and has its feedback connected in the same manner to generate the same sequence as that generated by shift register 40 of FIG. 2. The feedback circuit of shift register 86 consists of inverter 91 and 92, AND gates 93 and 94, and OR gate 95. In the remote station, however, the feedback of shift register 90 is not coupled back to the input of the input shift register but is compared with the received signals to determine if the sequences are identical.

"0" signals in tone demodulator 89 are coupled to AND gate 97, and "1" signals from tones demodulator 89 are coupled to AND gate 98. If the feedback circuit of shift register 90 indicates that a "1" should be received a signal output from OR gate 95 enables AND gate 97. If a "0" is received there is an output from AND gate 97 which is coupled to OR gate 99. If a "0" should be received there is no output from OR gate 95 and inverter 96 enables AND gate 98. If a "1" is received there is an output from AND gate 98 which is coupled to OR gate 99. There is an output from OR gate 99 if there is an output from either AND gates 97 or 98. The output from OR gate 99 is an error signal and indicates that there is a discrepancy between the received signals and the signal generated by remote sequence generator 90. The error signal is coupled through inverter 100 to bistable multivibrator 101 to remove an inhibiting signal from this bistable multivibrator.

The "0" and "1" outputs from tone demodulator 89 are also coupled to OR gate 102, thus OR gate 102 produces a pulse during the reception of each binary signal. Inverter 103 produces an output pulse at the cessation of the signal output from OR gate 102. The output of OR gate 102 is also coupled to bistable multivibrator 101 causing this bistable multivibrator to return to its first stable state as each pulse is received. As each pulse ceases the output of inverter 103 coupled to bistable multivibrator 101 will cause bistable multivibrator 101 to shift to its second stable state provided the inhibit signal has been removed. The inhibit signal is removed only when there is an error in the received sequence. Thus bistable multivibrator 101 acts as an error switch turning on whenever the error is detected.

The output of bistable multivibrator 101, when it is in its second stable state, is coupled to AND gate 106 disabling this AND gate. AND gate 106 is the address recognition AND gate and thus when an error is received the remote station will not recognize an address in shift register 90 as being the address of the remote station. The output of bistable multivibrator 101 is also coupled to shift register 90 causing this shift register to shift to a predetermined point in its sequence.

In normal operation, with no errors in the received sequence, bistable multivibrator 101 is not operative and AND gate 106 is enabled. The output of inverter 103 is also coupled to shift register 90 as a clock pulse to shift this register. When shift register 90 contains a binary number representing the address of the remote station, this is recognized by a signal coupled through AND gate 106 to bistable multivibrator 110 causing this multivibrator to shift to its second stable state.

With bistable multivibrator 110 in its second stable state an output signal is developed which resets counter 112, turns on reply clock 114 and transmitter 116 and operates antenna switch 87 to shift the antenna from the receiver to the transmitter. Reply clock 113 generates A, pulsed A and B clock pulses. The time interval between the A and B clock pulses is identical, however, the A clock and B clock pulses alternate. The pulsed A clock pulses are the lagging edges of the A clock pulses. The B clock pulses cause counter 112 to count through its sequence of operations. When counter 112 reaches count H it causes bistable multivibrator 116 to shift to its second stable state. The output of the second stable state of bistable multivibrator 116 is coupled to AND gates 118 and 119 enabling these AND gates.

Information which is recorded at the remote station and which is to be transmitted to the central station is stored in detector input storage modules 125 to 128. A B pulse from reply clock 114 shifts counter 112 to count I, producing an output signal which enables AND gate 121. The leading edge of the A clock pulse from reply clock 114 shifts bistable multivibrator 130 to its first stable state. The output from bistable multivibrator 130 produces an output signal coupled to multi-frequency tone generator 134, through AND gate 119. This oscillator is similar to multi-frequency oscillator 48 of FIG. 3. The output of AND gate 119 causes the multi-frequency oscillator 134 to generate a "0" tone. The pulsed A clock pulse is coupled to AND gates 121 to 124 to enable these gates. AND gate 121 is thus enabled and reads out the information stored in storage module 125. If a "0" is stored in this module there is no output and multi-frequency oscillator 124 continues to produce a zero output tone. However, if a "1" is stored in storage 125, an output signal is developed which is coupled through OR gate 136 to bistable multivibrator 130 shifting this multivibrator to its second stable state. With multivibrator 130 in its second stable state an output is produced from AND gate 118 causing multi-frequency oscillator 134 to develop a tone representing binary "1." The time interval between the A and pulsed A clock pulses is very short compared to the duration of the tone pulse generated by multi-frequency oscillator 134 and thus the short "0" tone produced is not recognized by the system as a "0" output tone. If a "1" is stored in storage 125 the output pulse from AND gate 121 is fed back into the storage 125 to reset the storage to "0." Counter 112 steps through positions J, K and L to read storage units 126 to 128 in the same manner as storage unit 125. The output of multi-frequency oscillator 134 is coupled to transmitter 116 and is transmitted to the central station.

When couner 112 reaches count M, an output signal is developed which shifts bistable multivibrator 116 to its first stable state disabling AND gates 118 and 119 and preventing further transmission of "0" or "1" tone signals. When counter 112 reaches count N, bistable multivibrator 118 is shifted to its first stable state. With bistable multivibrator 110 in its first stable state, reply clock 114 and transmitter 116 are turned off and antenna switch 81 connects the antenna 80 to receiver 82. The remote station is then in condition to receive further address signals from the central station.

The error output from OR gate 99 is also coupled to integrator 138 which integrates the error signals to provide an output voltage which is a function of the number of errors in a given period of time. When the output voltage from integrator 138 reaches a predetermined amplitude Schmitt trigger 131 is actuated to operate display unit 132. Display unit 132 may give a visual and audible warning that a large number of errors are occurring at the remote station.

Figures 5, 6, 7:
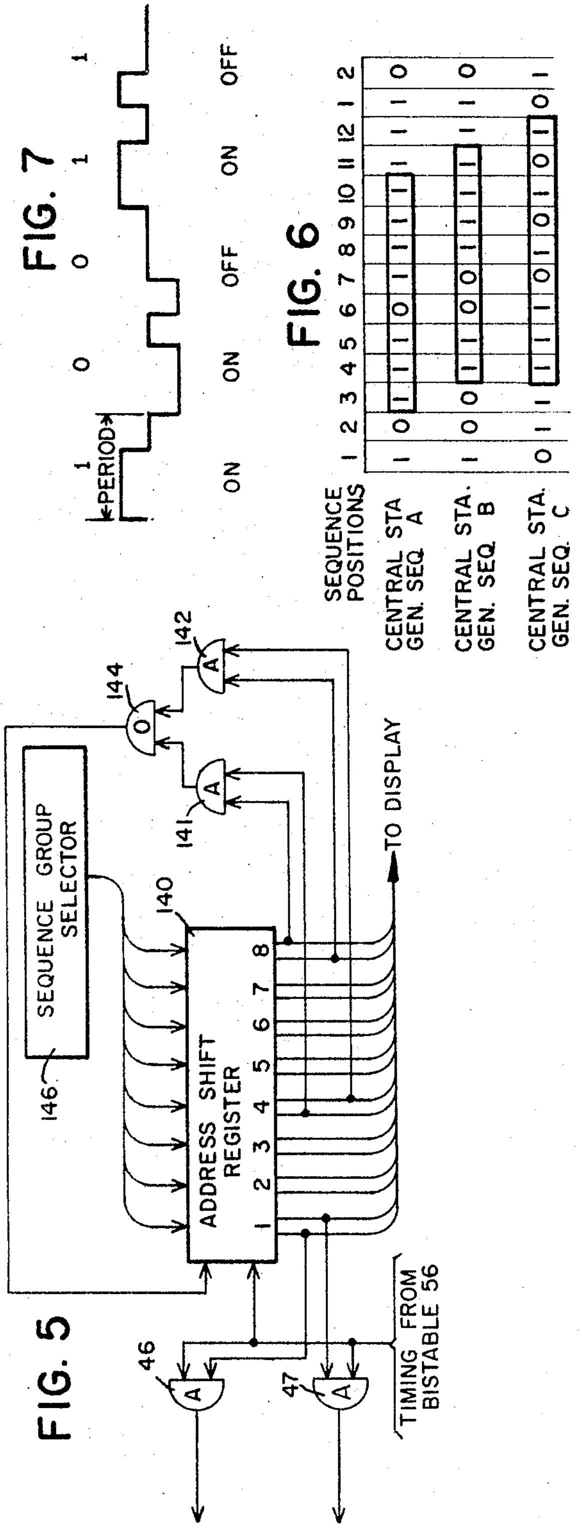
FIG. 5 is a block diagram showing the operation of a portion of the central station system used to generate one of a plurality of possible number sequences.
FIG. 6 is a table illustrating the generation and development of different address sequences by the same sequence generator.
FIG. 7 is a diagram illustrating the use of variable pulse width signals.

FIG. 5 illustrates an embodiment of the transmitter portion of the invention used to generate a desired one of a plurality of number sequences. Identical portions of FIG. 3 and FIG. 5 have the same reference numeral.

Shift register 140 is an 8 stage shift register with feedback taken from the fourth and eighth stages and combined through AND gates 141 and 142 and OR gate 144 to produce a sequence of numbers in the same manner as 5 stage shift register 40 of FIG. 3. If the numbers in the stages four and eight are the same a "1" is coupled into the first stage of the shift register and if the numbers in stages four and eight are different, a "0" is coupled into the first stage of the shift register.

FIG. 6 illustrates three possible sequences A, B and C which can be obtained from address shift register 140. The sequence generated by address shift register 140 depends upon the number stored initially in the shift register. While three groups A, B and C are shown in FIG. 6 for illustrative purposes, it is possible to obtain more than these three sequences. The invention is not limited to these sequences or the particular shift register and feedback circuitry used. Sequence group selector 146 of FIG. 5 provides storage for the numbers used for the initial selection of a particular sequence. The initial number is parallel transferred to shift register 140 to permit the shift register to generate the desired sequence.

By having more than one sequence available, the transmitter can interrogate different sequences of remote stations as desired. A single remote station may be addressed only by a number in a particular sequence or it may receive an address signal from more than one of the sequences used. In this manner it is possible to provide a large variation in the control of the remote stations.

FIG. 7 illustrates a timing diagram showing the transmission of a number sequence in which the pulse width of the signals transmitted is varied to provide additional information to the remote station. The pulse sequence for the transmission of the number 10011 is shown. The period of transmission for each bit can be considered to be three units in length with the three unit period is divided between a "1" signal and a neuter signal or a "0" signal and a neuter signal. When the "1" or "0" signal is two or more units in length and the neuter signal is one or less units in length, the remote station receives an ON command. If the "1" or "0" signal is one unit or less in length, and the neuter signal two or more units in length the command received by the remote station is an "OFF" command. While the commands in this example have been labeled "ON" and "OFF" they may be used to carry out any desired function at the remote station. Since the last number in the address code actuates a particular station, it is the length of the signal representing this number which determines which command is to be carried out.

Figure 8:
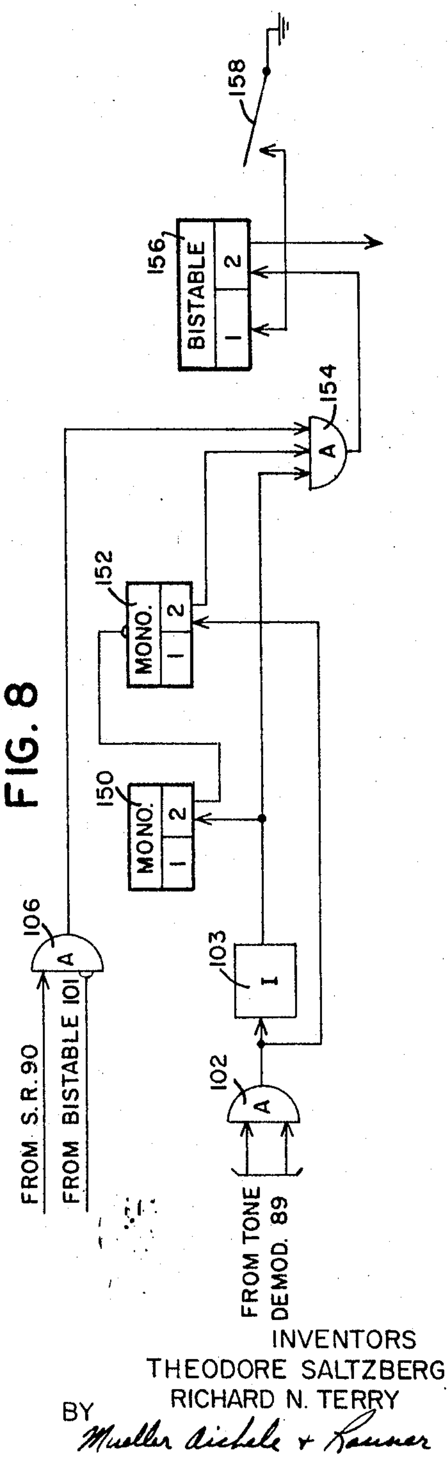
FIG. 8 is a block diagram of a portion of a receiver circuit responsive to pulse signals of varying width.

FIG. 8 is a block diagram of a receiving unit adapted to receive and utilize signals of varying length. The circuit of FIG. 8 is coupled to the circuit of FIG. 4 in the manner indicated and the portions of FIG. 8 which are identical to FIG. 4 have the same reference numerals.

The output signal from inverter 103 is the leading edge of the received signal and is coupled to monostable multivibrator 150 and AND gate 154. Monostable multivibrator 150 is triggered to its second state by the leading edge of the signal and produces an output which is coupled to monostable multivibrator 152 to inhibit this monostable multivibrator. After one and a half units of time, monostable multivibrator 150 reverts to its first state, removing the inhibiting pulse from monostable multivibrator 152. If the command received is an "ON" command the signal will be at least two units length and monostable multivibrator 152 will be triggered to its second state by the "ON" command after the inhibiting pulse is removed. If an "OFF" signal of one unit of time duration is received, the "OFF" signal will have ceased before the inhibit signal from monostable multivibrator 150 has been removed and thus no control action will take place. Monostable multivibrator 152 remains in its second state for two and a half time units and then reverts to its first state. AND gate 154 has been enabled by the output of AND gate 106 which is the address recognition signal. AND gate 154 is further enabled for two and a half time units by the output of monostable multivibrator 152. The leading edge of the signal following the address signal is coupled from AND gate 102 through inverter 103 to AND gate 154 providing the third input to AND gate 154 thereby producing an output which triggers bistable multivibrator 156 to its second stable state. Thus, the signal following the address signal must be transmitted within two and a half time units after the last bit of the address to provide a further check on the widths of the received signals. The output from the second stable state of bistable multivibrator 156 can be used to control desired functions at the remote unit. Switch 158 is used to manually reset bistable multivibrator 156 to its first stable state.

What is claimed is:

1. A system for selectively controlling a plurality of remote stations from a central station, including in combination, means positioned at the central station for generating a sequence of M numbers having no repeating subsequences of N or more numbers where M is greater than the largest number in the sequence and N is greater than one and less than M, means coupled to said generating means for transmitting said sequence to the plurality of remote stations, means located at each remote station for receiving said sequence, each of said receiving means being responsive to a predetermined sequence of N consecutive numbers of said sequence.

2. A system for selectively controlling a plurality of remote stations from a central station, including in combination, means positioned at the central station for generating a sequence of M numbers having no repeating subsequences of N or more numbers where M is greater than the largest number in the sequence and N is greater than one and less than M, means coupled to said generating means for transmitting said sequence to the plurality of remote stations, means located at each remote station for receiving said sequence, each of said receiving means being responsive to a different predetermined subsequence of N consecutive numbers of said sequence to develop a control signal, and means coupled to each of said receiving means and responsive to said control signal to transmit a reply signal to the central station.

3. A system for selectively controlling a plurality of remote stations from a central station, including in combination, means positioned at the central station for generating a binary sequence of M bits having no repeating subsequence of N or more bits where N is less than M, means coupled to said generating means for transmitting said binary sequence to the plurality of remote stations, means located at each remote station for receiving said binary sequence, each of said receiving means being responsive to a predetermined subsequence of N consecutive bits of said binary sequence.

4. A system for selectively controlling a plurality of remote stations from a central station, including in combination, means positioned at the central station for generating a binary sequence of M bits having no repeating subsequences of N or more bits where N is less than M, means coupled to said generating means for successively transmitting a plurality of binary sequences to the plurality of remote stations, means located at each remote station for receiving said binary sequences, each of said receiving means being responsive to a different predetermined subsequence of N consecutive bits of said sequences to develop a control signal, and means coupled to each of said receiving means and responsive to said control signal to transmit a reply signal to the central station.

5. A system for selectively controlling a plurality of remote stations from a central station, including in combination, means positioned at the central station for generating a central station sequence of M numbers having no repeating subsequence of N or more numbers where M is greater than the largest number in the sequence and N is greater than one and less than M, means coupled to said generating means for transmitting said central station sequence to the plurality of remote stations, means located at each remote station for receiving said central station sequence, each of said receiving means being responsive to a different predetermined subsequence of N consecutive numbers of said sequence to generate a control signal, function means coupled to each of said receiving means and responsive to said control signal to perform a particular function, means positioned at each remote station for generating a remote sequence identical to said central station sequence and in synchronism with said received central station sequence, comparing means coupled to said receiving means and said remote generating means for comparing said remote sequence and said received central station sequence, said comparing means being responsive to a difference between said remote sequence and said received central station sequence to generate an error signal, means coupling said comparing means to said function means being responsive to said error signal to prevent said performance of said particular function.

6. A system for selectively controlling a plurality of remote stations from a central station, including in combination, means positioned at the central station for generating a central station sequence of M numbers having no repeating subsequences of N or more numbers where M is greater than the largest number in the sequence and N is greater than one and less than M, means coupled to said generating means for transmitting said central station sequence to are plurality of remote stations, means located at each remote station for receiving said central station sequence, each of said receiving means being responsive to a different subsequence of N consecutive numbers of said sequence to develop a control signal, function means coupled to each of said receiving means and responsive to said control signal to perform a particular function, means positioned at each remote station for generating a remote sequence identical to said central station sequence and in synchronism with said received central station sequence, comparing means coupled to said receiving means and said remote sequence generating means for comparing said remote sequence and said received central station sequence, said comparing means being responsive to a difference between said remote sequence and said received central station sequence to generate an error signal, said remote sequence generating means being responsive to said error signal whereby said remote sequence generating means is shifted to a predetermined point in said remote sequence.

7. A system for selectively interrogating a plurality of remote stations from a central station, including in combination, central station shift register means for generating a central station maximal length binary sequence of M bits having no repeating subsequences of N or more bits where N is greater than one and less than M, means coupled to said central station shift register means for successively transmitting a plurality of said central station sequences to the plurality of remote stations, means located at each remote station for receiving said central station sequence, each of said receiving means being responsive to at least one predetermined subsequence of N consecutive bits of said central station sequence to develop a control signal, function means coupled to said receiving means and responsive to said control signal to carry out a particular function, remote shift register means for generating a remote station maximal length binary sequence identical to said central station sequence and in synchronism with said received central station sequence, comparing means coupled to said receiving means and said remote shift register means for comparing said remote sequence and said received central station sequence, said comparing means responsive to a difference between said remote sequence and said received central station sequence to generate an error signal, said receiving means being responsive to said error signal to inhibit said control signal to thereby prevent said performance of said particular function.

8. A system for selectively interrogating a plurality of remote stations from a central station, including in combination, central station shift register means for generating a central station maximal length binary sequence of M bits having no repeating subsequences of N or more bits where N is greater than one and less than M, means coupled to said central station shift register means for successively transmitting a plurality of said central station sequences to the plurality of remote stations, means located at each remote station for receiving said central station sequence, each of said receiving means being responsive to at least one predetermined subsequence of N consecutive bits of said central station sequence to develop a control signal, function means coupled to each of said receiving means and responsive to said control signal to transmit a reply signal to the central station, remote shift register means for generating a remote station maximal length binary sequence identical to said central station sequence and in synchronism with said received central station sequence, comparing means coupled to said receiving means and said remote shift register means for comparing said remote sequence and said received central station sequence, said comparing means being responsive to a difference between said remote sequence and said received central state sequence to generate an error signal, said remote shift register means is shifted to a predetermined point in said remote sequence.

9. A system for selectively controlling a plurality of remote stations from a central station, including in combination, means positioned at the central station for generating a plurality of sequences, each of said plurality of sequences including the characteristics of having M numbers and no repeating subsequences of N or more numbers where M is greater than the largest number in the sequence and N is greater than one and less than M and wherein M and N can be different for each of said plurality of sequences, means coupled to said generating means for transmitting one of said plurality of sequences to the plurality of remote stations, means located at each remote station for receiving said one sequence, at least a portion of said receiving means being responsive to a predetermined subsequence of N consecutive numbers of said one sequence to develop a control signal, and means coupled to each of said receiving means and responsive to said control signal to perform a particular function.

10. A system for selectively interrogating a plurality of remote stations from a central station, including in combination, central station shift register means for generating a plurality of central station binary sequences, each of said plurality of binary sequences including the characteristics of having M bits and no repeating subsequences of N or more bits where N is less than M and wherein M and N can be different for each of said plurality of binary sequences, binary number storage means for storing a plurality of binary numbers, each of said stored binary numbers, being a number in a different one of said plurality of binary sequences, transfer means coupled to said storage means and said central station shift register means for transfering a desired one of said stored numbers to said central station shift register means, said central station shift register means being responsive to said binary number transferred thereto to generate a particular one of said plurality of binary sequences, transmission means coupled to said central station shift register means for successively transmitting a plurality of said particular central station sequence to the plurality of remote stations, means located at least one of the remote station for receiving said particular central station sequence, said receiving means being responsive to at least one predetermined subsequence of N consecutive bits of said particular central station sequence to develop a control signal, function means coupled to each of said receiving means and responsive to said control signal to carry out a particular function, remote shift register means coupled to said receiving means for generating a remote station binary sequence identical to said particular central station sequence and in synchronism with said received particular central station sequence, comparing means coupled to said receiving means and said remote shift register means for comparing said remote sequence and said received particular central station sequence, said comparing means being responsive to a difference between said remote sequence and said received particular central sequence to generate an error signal, said receiving means being responsive to said error signal to inhibit said control signal to thereby prevent said performance of said function.

11. A system for selectively controlling a plurality of remote stations from a central station, including in combination, means positioned at the central station for generating a binary sequence of M bits having no repeating subsequences of N or more bits where N is less than M, transmission means coupled to said generating means for developing a series of pulse signals representative of said binary sequence with the width of said pulse signals being variable, said transmission means further acting to transmit said series of pulse signals representative of said binary sequence to the plurality of remote stations, receiving means located at each remote station for receiving said sequence represented by said series of pulse signals each of said receiving means being responsive to a different predetermined subsequence of N consecutive bits of said sequence and said width of said pulse signal representative of the last bit of said predetermined sequence of N consecutive bits to develop a control signal, and means coupled to each of said receiving means and responsive to said control signal to perform a particular function.

References Cited

UNITED STATES PATENTS

| | | | |
|---|---|---|---|
| 3,069,657 | 12/1962 | Green | 340—171 |
| 3,223,977 | 12/1965 | David et al. | 340—163 X |
| 3,303,470 | 2/1967 | Brixner et al. | 340—163 |

JOHN W. CALDWELL, *Primary Examiner.*

H. I. PITTS, *Assistant Examiner.*

U.S. Cl. X.R.

340—151